Patented Aug. 21, 1951

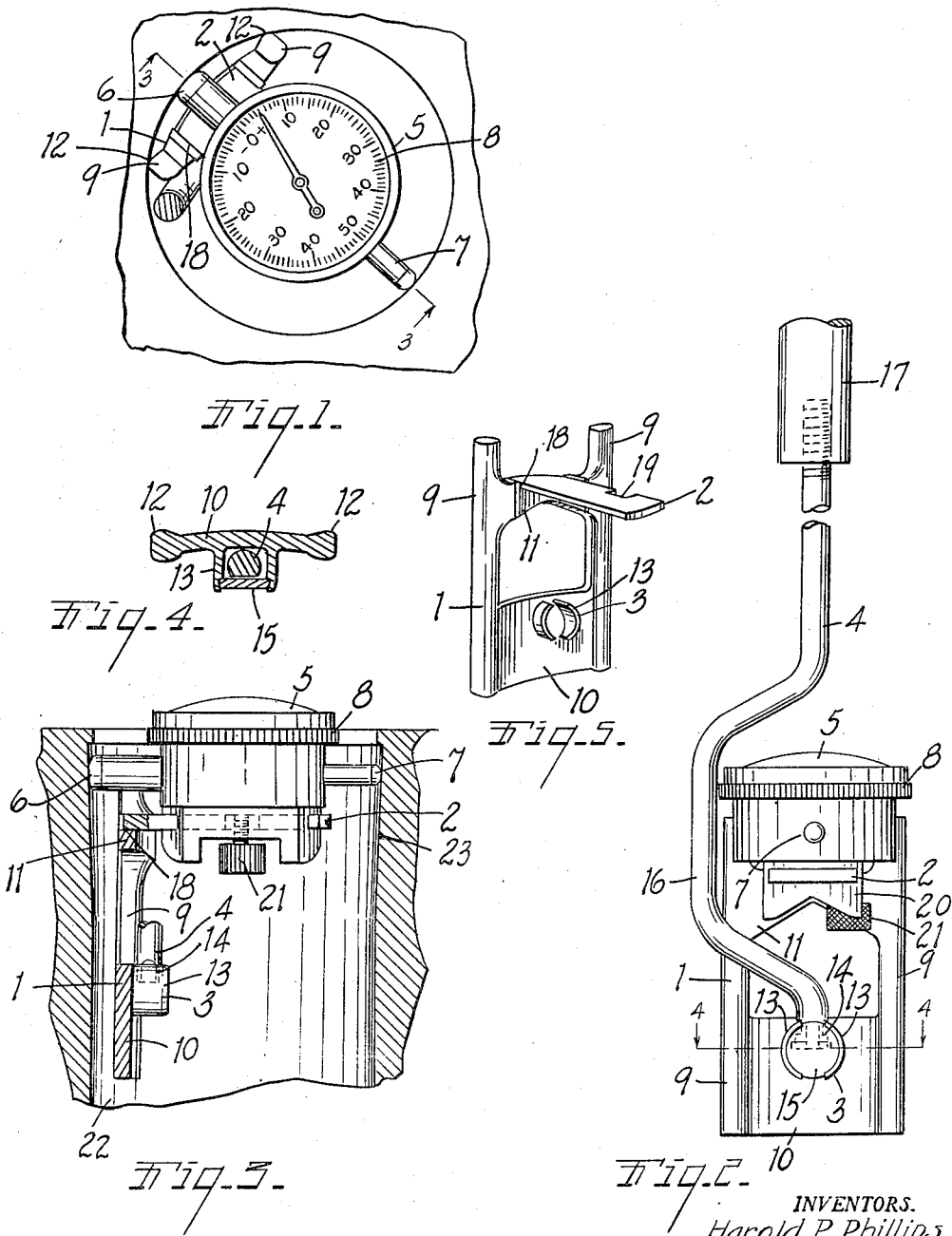

2,564,994

UNITED STATES PATENT OFFICE 2,564,994

CYLINDER GAUGE

Harold P. Phillips and Virgil D. Ackerman, Hastings, Mich., assignors to Hastings Manufacturing Company, Hastings, Mich., a corporation of Michigan Application April 9, 1948, Serial No. 20,005

3 Claims. (Cl. 33—178)

This invention relates to improvements in cylinder gauge.

The principal objects of this invention are:

First, to provide a gauge for measuring the taper in the cylinder of an internal combustion engine, which gauge will give more accurate readings than similar gauges known heretofore.

Second, to provide a cylinder gauge which will give accurate readings and which can be manipulated by relatively inexperienced workmen.

Third, to provide a cylinder gauge which cannot be tilted within the cylinder thus giving an inaccurate reading.

Fourth, to provide a gauge having the foregoing advantages and characteristics which can be manufactured at low cost.

Other objects and advantages pertaining to details and economies of our gauge will be apparent from a consideration of the following description and claims.

The drawings, of which there is one sheet, illustrate a preferred form of our gauge.

Fig. 1 is a fragmentary plan view of a motor block showing our gauge in operative position within a cylinder of the motor.

Fig. 2 is an elevational view of our gauge.

Fig. 3 is a fragmentary vertical cross sectional view along the plane of the line 3—3 in Fig. 1 and illustrating the method of operation of our gauge, portions of the cylinder wall being illustrated with exaggerated taper.

Fig. 4 is a cross sectional view of the connection between the handle and guide of our gauge taken along the plane of the line 4—4 in Fig. 2.

Fig. 5 is a perspective view of the guide and support of our gauge.

As is well known in the automobile art, the cylinders of an internal combustion engine become worn with use and the greatest wear takes place near the top of the cylinder where there is the most friction between the piston rings and the wall of the cylinder. In repairing engines as when the cylinder bore is refinished, it is necessary to measure the difference in diameter between the badly worn portions of the cylinder and those portions which are less badly worn. It is also necessary to measure the diameter of the cylinder in different directions to determine eccentricity or out-of-round wear in the cylinder.

Our gauge is designed to make the foregoing measurements and give an accurate reading at all times. The gauge consists generally of a guide 1 having a support arm 2 and a connection 3 for the handle 4. The support arm 2 carries a familiar type of measuring gauge 5 having a fixed abutment or reference point 6 and a moveable actuating plunger 7. The dial and scale 8 of the gauge is preferably angularly adjustable on the body of the gauge so that the scale can be set at zero for some reference portion in the cylinder and readings are then taken as plus or minus so many thousandths from the reference point.

More specifically, our guide 1 consists of a pair of parallel rail portions 9 joined together by a lower web 10 and upper cross bar 11. The outer sides of the rails 9 are finished along parallel lines 12 to bear against elements of the cylinder wall surface with the web 10 and cross bar 11 extending across a cord of the cylinder. The web 10 is provided with opposed arcuate flanges 13 arranged to receive the lower end of the handle 4 therebetween. The end of the handle is notched as at 14 to pass laterally between the upper edges of the flanges but not to pass vertically between the flanges. A retaining disk 15 is held between the inner edges of the flanges by folding or deforming the flanges around the disk. The connection between the handle and the guide is loose so that no tilting stress may be applied to the guide with the handle. The guide can be vertically supported and forced laterally against the cylinder wall by the handle but cannot be twisted in the cylinder. The handle 4 is offset as at 16 to pass around the gauge 5 and is provided at its upper end with a suitable grip 17.

The cross bar 11 is notched on its upper surface as at 18 to receive the inwardly extending support arm 2 and care is taken in assembling the arm to make sure that the arm lies in a plane perpendicular to the parallel guide edges 12. The support arm is provided with a notch 19 in one edge thereof and the under side of the gauge 5 is provided with a mounting bracket 20 defining a slot which receives the support arm 2 so that the actuating plunger 7 is parallel to the support arm 2 and perpendicular to the guides 9. A screw 21 extends through the bottom of the bracket 20 and through the notch 19 in the support arm and is threaded into the bottom of the gauge to prevent the gauge from accidently falling off of the arm but at the same time leaving the gauge free to float laterally on the arm.

In operation of our gauge the mechanic merely lowers the guide into the cylinder bore after manually depressing the actuating plunger 7 so that the plunger will enter the cylinder bore. The guide is lowered well into the cylinder bore where the edges 12 will engage the relatively unworn surface of the cylinder as at 22 in Fig. 3. The gauge can be forced downwardly until the actuating pin 7 also engages the unworn surface 22 and the dial of the gauge can then be set to zero. As previously explained the gauge 5 will slide on the support arm until the fixed abutment 6 engages the opposite side of the cylinder from the actuating plunger 7. The operator then holds the guide in contact with the cylinder wall by means of the handle and the guide will assume a position parallel to the axis of the cylinder. By then lifting up on the handle 4, the abutment 6 and actuating plunger 7 may be made to rise in the tapered portion 23 of the cylinder to measure how much wider the cylinder is at the top than in the unworn portion thereof.

Note that when the actuating plunger 7 is engaging and measuring the diameter of the particularly worn upper end 23 of the cylinder the guide 1 will still be engaged with the unworn portion 22 of the cylinder to maintain the guide parallel to the axis of the cylinder. Further the connection between the handle and the guide is well below the plunger 7 and opposite the unworn portion of the cylinder. The gauge will therefore be maintained in a position perpendicular to the walls of the cylinder to give an accurate reading of the relative sizes of different portions of the cylinder. The extent to which the handle 16 projects below the abutments of the gauge is not particularly critical so long as the connection between the handle and the guide is spaced sufficiently below the gauge abutments to be located opposite the unworn portion of the cylinder when the gauge abutments are elevated to the top of the cylinder. Since most of the wear in automobile engines occurs in the first or upper one-half inch of the cylinder bore, a spacing of one inch or greater between the gauge abutments and the handle connection 3 will be adequate to insure the accurate operation of our gauge.

Since the handle 16 is freely and loosely connected to the guide it will be impossible for a careless or unskilled workman to tilt the guide and gauge within the cylinder wall and thus obtain erroneous readings. The entire gauge consists of relatively few and inexpensive parts and can be used to quickly and accurately determine the amount of taper in the cylinder.

We have thus described a highly practical commercial embodiment of our gauge so that others may reproduce the same with such minor modifications as may appear desirable.

Having thus described our invention, what we claim as new and desire to secure by Letters Patent is:

1. A cylinder gauge comprising, a guide member having spaced parallel work engaging portions along its sides joined by a lower web and an upper cross member, a handle having a loose connection to said web substantially below said cross member, a support arm secured to said cross member in perpendicular relationship to the plane of said side portions and defining a slot, a measuring instrument having one fixed abutment and an opposed movable actuating abutment and being slidably supported on top of said arm with said abutments also spaced above said arm, and means carried by said instrument and engageable with the ends of said slot to retain said instrument on said arm, said handle extending above said instrument whereby said guide and instrument may be lowered into a cylinder bore and having an offset portion extending around said instrument whereby said handle is operative to press the lower portion of said guide against the cylinder wall below said instrument.

2. A cylinder gauge comprising a guide member having spaced parallel work engaging portions, a handle having a loose swingable connection to said guide member and extending thereabove, a support arm secured to said guide member in perpendicular relationship to the plane of the work engaging portions, and a measuring instrument having oppositely extending work engaging abutments, said instrument being slidably supported on said arm with said abutments extending perpendicularly to said work engaging portions, said connection being positioned substantially below said abutments.

3. A tool for measuring the diameter of cylinder bores comprising a measuring instrument having oppositely extending work engaging abutments and adapted to indicate variations in the diameter of said bore as said instrument is moved in said bore, a support for said instrument having a sliding connection therewith, whereby said instrument may move on said support parallel to the diameter being measured by said instrument, a guide member secured to said support and having spaced parallel work engaging surfaces disposed in a plane perpendicular to said support, said work engaging portions extending substantially below said support, and a handle for said tool connected to said guide member at least one inch below said support and said abutments and having a loose connection therewith permitting limited universal movement between said handle and said guide.

HAROLD P. PHILLIPS.
VIRGIL D. ACKERMAN.

REFERENCES CITED

The following references are of record in the file of this patent:

UNITED STATES PATENTS

| Number | Name | Date |
|---|---|---|
| 1,252,634 | Walker | Jan. 8, 1918 |
| 1,425,284 | Pratt | Aug. 8, 1922 |
| 1,591,258 | Ames | July 6, 1926 |
| 1,619,771 | Tingley | Mar. 1, 1927 |
| 1,816,061 | Storm | July 28, 1931 |
| 1,847,906 | Simpson | Mar. 1, 1932 |
| 2,073,089 | Autenreith | Mar. 9, 1937 |
| 2,088,362 | Blazek et al. | July 27, 1937 |
| 2,371,451 | Larson | Mar. 13, 1945 |

FOREIGN PATENTS

| Number | Country | Date |
|---|---|---|
| 604,661 | Germany | Oct. 25, 1934 |